United States Patent
Chundury et al.

(10) Patent No.: US 6,599,595 B1
(45) Date of Patent: Jul. 29, 2003

(54) MULTILAYER POLYMER COMPOSITE FOR MEDICAL APPLICATIONS

(75) Inventors: Deenadayalu Chundury, Newburgh, IN (US); Kenneth Brown, Princeton, IN (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/130,755

(22) Filed: Aug. 7, 1998

(51) Int. Cl.[7] .................. B32B 27/00; B32B 27/08; B32B 27/32
(52) U.S. Cl. ............... 428/35.2; 428/35.4; 428/35.7; 428/36.6; 428/36.7; 428/516; 428/518
(58) Field of Search ............................. 428/35.2, 35.4, 428/35.7, 36.6, 36.7, 516, 518; 525/210, 240

(56) References Cited

U.S. PATENT DOCUMENTS

| | | | | |
|---|---|---|---|---|
| 4,826,909 A | * | 5/1989 | Lakshmanan et al. ...... | 524/478 |
| 5,274,035 A | | 12/1993 | Chundury ................... | 525/92 |
| 5,385,781 A | | 1/1995 | Chundury et al. .......... | 428/330 |
| 5,681,627 A | * | 10/1997 | Mueller ..................... | 428/35.2 |
| 5,759,648 A | * | 6/1998 | Idlas ......................... | 428/34.9 |
| 6,096,831 A | * | 8/2000 | Nagaoka et al. ............ | 525/240 |

FOREIGN PATENT DOCUMENTS

| | | | |
|---|---|---|---|
| EP | 0397517 A2 | | 11/1990 |
| EP | 0564206 A | * | 10/1993 |
| JP | 07125158 A | * | 5/1995 |
| JP | 08225692 A | * | 9/1996 |
| JP | 09141793 A | * | 6/1997 |
| JP | 09155996 A | * | 6/1997 |
| WO | 9214784 | | 3/1992 |

* cited by examiner

*Primary Examiner*—Sandra M. Nolan
(74) *Attorney, Agent, or Firm*—Rankin, Hill, Porter & Clark LLP

(57) ABSTRACT

This invention relates to multilayer thermoformable structures comprising a layer (A), a layer (C), and a layer (B) disposed between layers (A) and (C). The multilayer structures and polymer compositions of the invention are useful in preparing thermoformed articles and are particularly useful in preparing medical components such as IV bags. The multilayer structures and the polymer composition have good thermoformability and chemical resistance. A multilayer thermoformable structure according to the invention comprises: a layer (A) of a polymer composition comprising a homopolymer or copolymer of polypropylene; a layer (B) of a polymer composition comprising a homopolymer of polypropylene; and a layer (C) of a polymer composition comprising: (i) from about 45% to about 80% by weight of a homopolymer or copolymer of polypropylene or mixtures thereof; and (ii) from about 15% to about 40% by weight of an ethylene copolymer made using a metallocene catalyst.

17 Claims, No Drawings

MULTILAYER POLYMER COMPOSITE FOR MEDICAL APPLICATIONS

TECHNICAL FIELD OF THE INVENTION

This invention relates to multilayer polymer structures or composites, and more particularly to polymer multilayer thermoplastic composites for use in medical applications.

BACKGROUND OF THE INVENTION

The thermoplastic multilayer polymer structures of this invention may be used in a variety of applications including for example, automotive and appliance applications. However, the structures of the present invention are best suited for medical applications such as intravenous (IV) bags, tubing, etc.

When preparing multilayer structures, the layers of the structures must adhere to each other. If the layers of the structure do not adhere to each other a glue or tie layer is used to stick the layers of the structure together. Layers that adhere to each other without a glue layer are useful and generally most desired.

Thermoplastics have been widely used in the formation of medical parts for which excellent design, performance and volume capabilities are required. In order to be useful in medical applications, a thermoplastic must meet various criteria. The plastics must be inexpensive and easy to manufacture. The plastic should not react with or leach additives into physiologic solutions. The plastics must have resistance to degradation and/or deformation from steam, irradiation and ethylene oxide sterilization techniques. The present invention serves to provide a material that effectively meets these criteria.

SUMMARY OF THE INVENTION

This invention relates to a multilayer thermoformable thermoplastic structure comprising:

- a layer (A) of a polymer composition comprising a homopolymer or copolymer of polypropylene;
- a layer (B) comprising a homopolymer of polypropylene; and
- a layer (C) comprising: (i) from about 45% to about 80% by weight of a homopolymer or copolymer of polypropylene or mixtures thereof; and (ii) from about 15% to about 40% by weight of an ethylene copolymer made using a metallocene catalyst.

The multilayer structures of the present invention are useful in preparing thermoformed articles, and are particularly useful in preparing parts or components for use in medical applications, such as, for example, intravenous bags and tubing. The layers of the multilayer structure do not require a glue or adhesive of any type and are generally recyclable. Also, the multilayer structure of the present invention does not contain any poly(vinyl chloride) ("PVC") and the related disposal problems of high halogen content materials is thus not an issue. Furthermore, the structure of the present invention does not rely on the use of expensive styrene-butadiene materials as do many prior art medical thermoplastic compositions. Thus, the composition of the present invention is substantially free of PVC and styrene-butadiene materials.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DESCRIPTION OF THE PREFERRED EMBODIMENTS

Unless the context indicates otherwise, throughout the specification and claims, the amount of the polymers present is determined exclusive of filler or other nonpolymer additive in the polymer compositions. Therefore the amount of each polymer is determined by dividing the weight of the polymer by the combined weight of all polymers present in the composition.

Layer (A)

The multilayer structure has an outside, top or cap layer (A). This layer comprises a polymer composition comprising a homopolymer or copolymer of polypropylene. The number average molecular weight of the polypropylene polymers is preferably above about 10,000 and more preferably above about 50,000. Such polypropylene polymers are preferably produced using a Ziegler catalyst. The polypropylene polymers useful in preparing the polymer blends of the present invention are well known to those skilled in the art and many are commercially available. Examples of such commercially available polypropylenes include Fina 8453, Aristech F007S and F007F, Shell 7C06 and 5A97, Exxon PD7/32, Lyondell X0200 and X0201, Aristech 4007F and 4040F (copolymer of propylene and ethylene) and Quantum PP8479HV. Preferably,for many medical applications such as IV bags the layer (A) comprises a random copolymer of polypropylene. An example of such a random copolymer is a material sold by Rexene under the trade designation PP 23M2.

Layer (B)

The multilayer structure also contains a layer (B) that is disposed between layer (A) and layer (C). This layer comprises a homopolymer of polypropylene. The homopolymer has a tensile modulus of less than 100,000 psi and preferably, at least 10% by weight of the homopolymer displays an amorphous structure. Such materials are known as flexible polyolefins. An example of a homopolymer suitable for use in the present invention is a homopolymer sold by Rexene under the trade designation W110.

Layer (C)

The multilayer structure also contains a layer (C). In many applications this layer serves as a sealing layer to prevent the migration of water and other liquids through the structure. The layer (C) comprises: (i) from about 45% to about 80%, and preferably from about 50% to about 70% by weight of a homopolymer or copolymer of polypropylene or mixtures thereof; and (ii) from about 15% to about 40%, and preferably from about 20% to about 35% by weight of an ethylene copolymer made using a metallocene catalyst.

The number average molecular weight of the polypropylene polymers is preferably above about 10,000 and more preferably above about 50,000. Such polypropylene polymers are preferably produced using a Ziegler catalyst. The polypropylene polymers useful in preparing the polymer blends of.the present invention are well known to those skilled in the art and many are commercially available. Examples of such commercially available polypropylenes include Fina 8453, Aristech F007S and F007F, Shell 7C06 and 5A97, Exxon PD7/32, Lyondell X0200 and X0201, Aristech 4007F and 4040F (copolymer of propylene and ethylene) and Quantum PP8479HV.

The component (ii) comprises an ethylene copolymer made using a metallocene catalyst or an equivalent single site metal catalyst. Such copolymers include ethylene-butene, propylene, hexene or octene copolymers made using a metallocene or equivalent single site catalyst. Such ethylene copolymers suitable for use in the present invention display a melting point below about 105° C. Such ethylene-butene or hexene copolymers are available commercially from Exxon Chemicals of Houston, Tex., under the trade designation Exact. An example of a preferred commercially available ethylene copolymer suitable for use in the present invention is a saturated ethylene-octene copolymer sold under the trade designation Engage 8100 by DuPont Dow Elastomers of Wilmington, Del.

Fillers

The above polymer layers may contain one or more fillers of the type used in the polymer art. Examples of fillers employed in a typical compounded polymer blend according to the present invention include talc, calcium carbonate, mica, wollastonite, dolomite, glass fibers, boron fibers, carbon fibers, carbon blacks, pigments such as titanium dioxide, or mixtures thereof. The amount of filler included in the blended polymers may vary from about 0% to about 20% of the combined weight of polymer and filler. Generally amounts from about 5% to about 15% from about 0% to about 4%, may be included. However, for many medical applications, preferably the layers contain less than 1% by weight filler and are preferably substantially free of fillers.

The fillers may be treated with coupling agents to improve the bond between the fillers to the resin. For example, the fillers can be treated with materials such as fatty acids (e.g., stearic acid), silanes, maleated polypropylene, etc. The amount of coupling agent used is an amount effective to improve the bond between the fillers with the resin. However, once again, it will be appreciated that in many medical applications, it is generally preferred that no fillers be included in the layers.

Miscellaneous Additives

Various additives may be included in the polymer compositions of the layers at various rates of addition. Such additives include, for example, light stabilizers, heat stabilizers, antioxidants, lubricants, colorants, pigments, etc. Generally, additives are included in the polymer blend at a rate of less than 10% by weight, and preferably less than 3% by weight, and more preferably less than 1% by weight of the polymer blend composition. However, for medical applications, preferably additive additions are kept to a minimum or are substantially free of any type of additives.

Additional Polymers

It will be appreciated that polymer compositions of the various layers made in accordance with the present invention may include one or more additional polymeric materials such as, for example elastomers or rubbers such as silicone rubbers or styrene-butadiene materials, maleated materials, styrenic materials, etc. These additional polymers would be present in an amount less than 10% by weight, and preferably less than 5% by weight, and more preferably less than 1% by weight of the polymer blend compositions. However, once again, for medical applications, preferably the use of such polymers is avoided, and the various layers are preferably substantially free of such additional polymers.

Preparation of Polymer Blends

The blended polymer compositions of the present invention can be prepared by techniques well known to those skilled in the art. For example, a particularly useful procedure is to intimately mix the polymers using conventional melt mixing equipment such as a mill, a Banbury, a Brabender, a single or twin screw extruder, continuous mixers, kneaders, etc. For example, the polymers may be intimately mixed in the form of granules and/or powder in a high shear mixer. One preferred process for preparing the blended polymers utilizes the Farrell Compact Processor, CP-23 and CP-57. Short residence times and high shear are readily obtained in a CP-23 and a CP-57. "Intimate" mixing means that the mixture is prepared with sufficient mechanical shear and thermal energy to produce a dispersed.phase that is finely divided and homogeneously dispersed in the continuous or principal phase.

The layers may be applied by co-extrusion, laminating, etc., or layers (A) and (C) can be applied from a solution or a dispersion of the materials in water or an organic liquid such as methylene chloride, methyl benzene (toluene) and dimethyl benzene (xylene).

Thermoformed articles having desired shapes can be produced from each of the blended polymer compositions of the present invention by:

(I) feeding a sheet of the blended polymer composition of the invention to a heating station;

(II) heating the sheet to its softening point; and (Ill) feeding the softened sheet to a forming station where it is thermoformed into articles of the desired shape.

Various features and aspects of the present invention are illustrated further in the examples that follow. While these examples are presented to show one skilled in the art how to operate within the scope of this invention, they are not to serve as a limitation on the scope of the invention where such scope is only defined in the claims. Moreover, in the following examples, preparation of blends, compounds, molded specimens and multilayer sheets are illustrated. These examples serve merely as illustrative embodiments of the present invention and are not to be considered limiting.

Unless otherwise indicated in the following examples and elsewhere in the specification and claims, all parts and percentages are by weight, temperatures are in degrees centigrade and pressures are at or near atmospheric.

EXAMPLE 1

A blended composition for use as layer (C) made in accordance with the present invention as shown in Table 1 is prepared on a Farrell Compact Processor, CP-57 at a mixer rotor speed of about 500 rpm and extruded at about 220° C. into strands which are passed through water bath and air wipe prior to pelletizing.

TABLE 1

| Component | Weight % |
|---|---|
| Fina Z Polymer Z9450 (Random Polypropylene Copolymer) | 69.90 |
| Engage 8100 PR (Ethylene Polypropylene Copolymer) | 30.00 |
| Ethanox 330 (Antioxidant, Albemarle) | 0.10 |

EXAMPLE 2

A random copolymer of polypropylene available from Rexene Products of Dallas, Tex., under the trade designation PP 23M10 is provided for use as layer (A).

EXAMPLE 3

A flexible homopolymer of polypropylene available from Rexene Products of Dallas, Tex., under the trade designation W110 is provided for use as layer (B).

EXAMPLE 4

A multilayer structure is made by co-extruding polymer compositions from Examples 1, 2 and 3 above such that layer (B) is disposed between layers (A) and (C). The polymer composition of Example 1 is placed in an extruder and heated to a melt temperature 220° C. The extruder is operating at 100 rpm and has a head pressure of 2000 psi. The composition of Example 2 is prepared in a co-extruder. The co-extruder is operating at 125 rpm and has a head pressure of 1750 psi. The composition of Example 3 is prepared in a second co-extruder. The second co-extruder is operated at 125 rpm and a head pressure of 1750 psi. The polymer compositions from all three extruders are extruded to a co-extrusion feed block where the layers are brought together and then made to flow through a sheet die at 205° C. The co-extruded sheet then passes between a series of polish rolls that both cool and impart a surface to the sheet. The polymers form a multilayer sheet.

EXAMPLE 5

A multilayer structure from Example 4 is placed in a standard vacuum forming equipment. The sheet is heated to 177° C. until the sheet sags about 6 to 13mm. The mold is closed to form a thermoformable article.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A multilayer thermoformable structure that does not contain a glue or adhesive comprising:
    a layer (A) of a polymer composition comprising a homopolymer or copolymer of polypropylene;
    a layer (B) of a polymer composition comprising a homopolymer of polypropylene; and
    a layer (C) of a polymer composition comprising: (i) from about 45% to about 80% by weight of a homopolymer or copolymer of polypropylene or mixtures thereof; and (ii) from about 15% to about 40% by weight of an ethylene-octene copolymer made using a metallocene catalyst;
    wherein layer (B) is disposed between layers (A) and (C).

2. The structure as set forth in claim 1 wherein said ethylene-octene copolymer (C)(ii) displays a melting point below about 105° C.

3. The structure as set forth in claim 1 wherein said layer (C) comprises from about 50% to about 70% by weight said homopolymer or copolymer of polypropylene or mixtures thereof (C)(i).

4. The structure as set forth in claim 1 wherein said layer (C) comprises from about 20% to about 35% by weight of said ethylene-octene copolymer (C)(ii).

5. The structure as set forth in claim 1 wherein said layer (A) comprises a random copolymer of polypropylene.

6. The structure as set forth in claim 1 wherein said homopolymer of said layer (B) comprises a flexible polyolefin.

7. The structure as set forth in claim 1 wherein said homopolymer of said layer (B) includes at least 10% by weight of an amorphous structure.

8. The structure as set forth in claim 1 wherein said homopolymer of said layer (B) displays a tensile modulus of less than 100,000 psi.

9. An IV bag including a multilayer thermoformable structure that does not contain a glue or adhesive comprising:
    a layer (A) of a polymer composition comprising a homopolymer or copolymer of polypropylene;
    a layer (B) of a polymer composition comprising a homopolymer of polypropylene; and
    a layer (C) of a polymer composition comprising: (i) from about 45% to about 80% by weight of a homopolymer or copolymer of polypropylene or mixtures thereof; and (ii) from about 15% to about 40% by weight of an ethylene-octene copolymer made using a metallocene catalyst;
    wherein layer (B) is disposed between layers (A) and (C).

10. An IV bag as set forth in claim 9 which is substantially free of poly(vinyl chloride).

11. An IV bag as set forth in claim 9 which is substantially free of styrene-butadiene materials.

12. The multilayer thermoformable structure according to claim 1 wherein said layer (C) consists essentially of a blend of: (i) about 70% by weight of a random copolymer of polypropylene and ethylene; and (ii) about 30% by weight of a copolymer of ethylene and octene made using a metallocene catalyst.

13. The multilayer structure according to claim 1 wherein said medical application is an IV bag.

14. The multilayer thermoformable structure according to claim 1 wherein said layer (A) consists essentially of a random copolymer of polypropylene and ethylene; said layer (B) consists of a homopolymer of polypropylene of which at least 10% by weight displays an amorphous structure; and said layer (C) consists essentially of a blend of: (i) about 70% by weight of a random copolymer of polypropylene and ethylene; and (ii) about 30% by weight of a copolymer of ethylene and octene made using a metallocene catalyst.

15. The multilayer structure according to claim 1 wherein said medical application is an IV bag.

16. The multilayer thermoformable structure according to claim 1 wherein the multilayer thermoformable structure consists essentially of:
    a layer (A) of a polymer composition comprising a homopolymer or copolymer of polypropylene;
    a layer (B) of a polymer composition comprising a homopolymer of polypropylene; and
    a layer (C) of a polymer composition comprising: (i) from about 45% to about 80% by weight of a homopolymer or copolymer of polypropylene or mixtures thereof; and (ii) from about 15% to about 40% by weight of an ethylene-octene copolymer made using a metallocene catalyst;
    wherein layer (B) is disposed between layers (A) and (C).

17. The IV bag according to claim 9 wherein the multilayer thermoformable structure consists essentially of:
    a layer (A) of a polymer composition comprising a homopolymer or copolymer of polypropylene;
    a layer (B) of a polymer composition comprising a homopolymer of polypropylene; and
    a layer (C) of a polymer composition comprising: (i) from about 45% to about 80% by weight of a homopolymer or copolymer of polypropylene or mixtures thereof; and (ii) from about 15% to about 40% by weight of an ethylene-octene copolymer made using a metallocene catalyst;
    wherein layer (B) is disposed between layers (A) and (C).

* * * * *